W. A. DICK.
GEAR SHIFTING MECHANISM.
APPLICATION FILED OCT. 3, 1914.
1,264,778.
Patented Apr. 30, 1918.
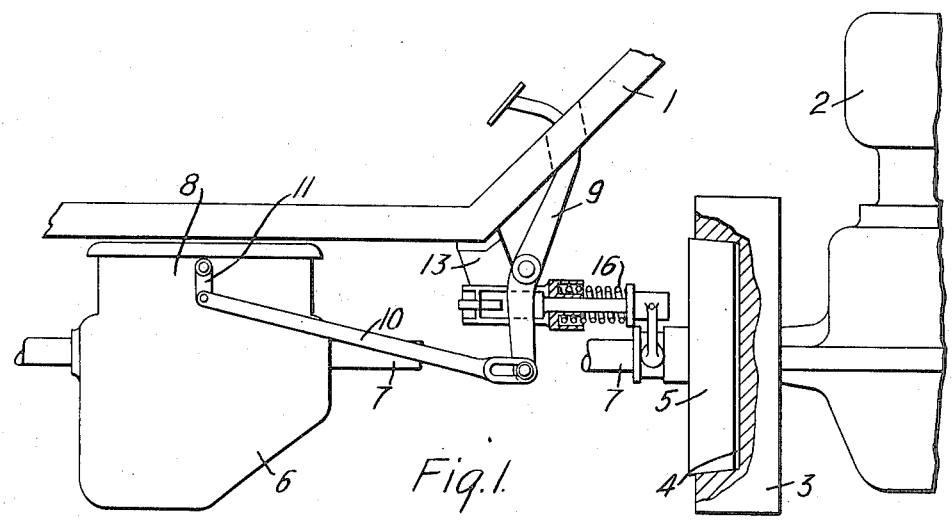
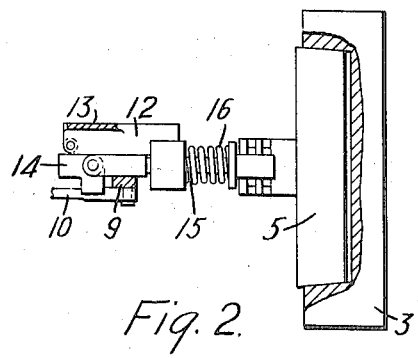
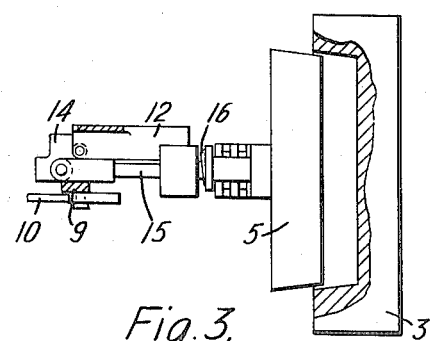
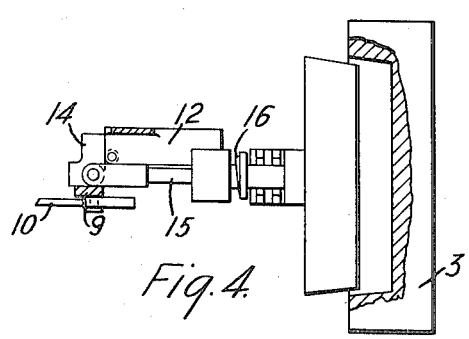
WITNESSES:
Fred. A. Lind
J. R. Langley.
INVENTOR
William A. Dick
BY
Charley G. Carr
ATTORNEY

UNITED STATES PATENT OFFICE.

WILLIAM A. DICK, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,264,778.     Specification of Letters Patent.     Patented Apr. 30, 1918.

Application filed October 3, 1914. Serial No. 864,730.

*To all whom it may concern:*

Be it known that I, WILLIAM A. DICK, a citizen of the United States, and a resident of Pittsburgh, in the county of Allegheny and State of Pennsylvania, have invented a new and useful Improvement in Gear-Shifting Mechanisms, of which the following is a specification.

My invention relates to gear shifting mechanisms and particularly to such mechanisms as are actuated by the usual clutch-pedal lever of automobiles or other motor vehicles.

My invention has for its object to provide a simple means for freeing the clutch-pedal lever from the tension of the clutch spring at a predetermined point in the path of its movement.

In the operation of automatic gear-shifting mechanisms that are controlled by the usual clutch-pedal lever, it is, ordinarily, the practice to first disengage the engine clutch against the force of an opposing spring and then, by a further movement of the pedal lever, to actuate the gear-shifting mechanism to produce the desired change in speed ratio. The gear-shifting mechanism is usually provided with a spring for returning it to its normal position after the pedal lever has been released by the operator. This arrangement requires that the actuation of the gear-shifting mechanism must be accomplished against the force of both the clutch spring and the spring of the gear-shifting mechanism. Since the force required to shift the transmission gear wheels into mesh for the several speed ratios is small relatively to that required for operating the clutch, the opposition of the clutch spring materially affects the utility of gear-shifting mechanisms of the type above described. Because of the comparatively large force required to oppose the springs, it is impossible for the operator to determine whether the gears are in the proper relation to mesh easily when they are brought into engagement. In other words, the ability to ascertain the relation of the gear wheels by the muscular effort required, such as is possible with the hand-operated gear-shift lever, is destroyed.

I provide a mechanism by means of which the pedal lever is automatically freed from the tension of the clutch spring when the engine clutch is disengaged. Further movement of the pedal lever is not opposed by the clutch spring, and the force required to actuate the gear-shifting mechanism is thereby materially reduced. In operating a mechanism constructed in accordance with my invention, it is possible to determine, by the force required, whether the gear wheels have the proper relative speeds in order that they may mesh readily.

The details of my invention are described in connection with the accompanying drawings in which Figure 1 is a side view, partially in elevation and partially in section, of a portion of an automobile with my invention applied thereto. Figs. 2, 3 and 4 are views, partially in elevation and partially in section, of an automatic controlling mechanism and its related parts in different operative positions.

An automobile 1, only a portion of which is shown, comprises a gas engine 2 having the usual fly wheel 3. The fly wheel 3 is provided with a conical recess 4 to form a clutch member which coacts with a movable clutch member 5. The transmission mechanism 6 of the vehicle is connected to the movable clutch member 5 by a shaft 7 upon which the clutch member 5 is slidably mounted. A gear-shifting mechanism 8, which may be of any well known or usual type, is mounted upon the casing of the transmission mechanism. Since the details of the transmission mechanism and the gear-shifting mechanism form no part of the present invention, illustration and description of the same have been omitted as unnecessary to an understanding of the mechanism embodying my invention.

The clutch member 5 and the gear-shifting mechanism 8 are controlled by a pedal lever 9. A link 10, which has a pin and slot connection with the lever 9, and a crank arm 11 operatively connect the pedal lever 9 to the gear-shifting mechanism 8. The connection of the pedal lever 9 to the clutch member 5 is controlled by an automatic mechanism which comprises a guide member 12 that is connected by a bracket 13 to any suitable stationary part of the vehicle and extends in a direction parallel to the path of movement of the pedal lever 9. A lever 14, which has two arms extending approximately at an angle of 90°, the one from the other, is pivotally secured to a rod 15 that is connected to the movable clutch member 5. A spring 16 normally retains the clutch member 5 in engagement with the clutch member 4 in the fly-wheel 3. The spring 16 may, if desired, be so arranged as to be placed under tension instead of compression as illustrated, the principle of operation being the same in either case.

Normally, the various parts occupy their respective positions, as illustrated in Figs. 1 and 2. One arm of the lever 14 is parallel to, and in slidable engagement with, one side of the guide member 12. The other arm of the lever projects into the path of movement of the pedal lever 9. When it is desired to change the speed ratio of the transmission mechanism 6, the pedal lever 9 is actuated forwardly to disengage the clutch members 4 and 5. The lost-motion connection between the lever 9 and the gear-shifting mechanism 8 permits the disengagement of the engine clutch without affecting the gear-shifting mechanism.

While the clutch is being disengaged, the lever 14 is actuated to the left, as shown, by the lever 9. Rotation of the lever 14 about its pivot is prevented by the guide member 12. When the end of the guide member 12 is reached, the lever 14 is actuated about its pivot to the position illustrated in Fig. 3, with the slidable arm against one end of the guide member 12. The other arm is now without the path of movement of the pedal lever. Further movement of the pedal lever to the position illustrated in Fig. 4 operates to actuate the gear shifting mechanism. This movement is unopposed by the force of the clutch spring 16 because the lever 14 remains in the position above described, the lever 9 having a slidable engagement therewith to prevent its rotation.

The clutch member 5 is thus retained in its disengaged position with the spring 16 under compression, until the gear-shifting mechanism has been actuated and the pedal lever 9 is returned to the position illustrated in Fig. 3. Further return movement of the pedal lever 9 permits the spring 16 to return the rod 15 and its connected parts to their respective normal positions, as illustrated in Figs. 1 and 2. The engine then drives the vehicle at the speed ratio established by the transmission mechanism. The normal operation of the clutch member 5 for the usual purposes is accomplished independently of the gear-shifting mechanism.

While other suitable mechanisms may be substituted for the automatic clutch-controlling mechanism, I have described my invention in its preferred embodiment. It is understood, however, that such changes may be made without departing from the spirit of my invention as fall within the scope of the appended claims.

I claim as my invention:

1. The combination with a movable member and an actuating member therefor, of a spring for opposing the movement of said movable member, and means for freeing the actuating member from the force of said spring at a predetermined point in its path of movement and for retaining the movable member in an intermediate position during the continuation of movement of the actuating member in the same direction.

2. The combination with a movable member and an actuating member therefor, of a spring for opposing the actuation of said movable member, and means operating at a predetermined point in the path of movement of said actuating member to retain said movable member in a relatively stationary position during the continuation of movement of the actuating member in the same direction.

3. The combination with a movable member and an actuating member therefor, of a spring for normally retaining the movable member in one position, and means whereby, when the actuating member has reached a predetermined point in its path of movement, the movable member is retained in a relatively stationary position while the actuating member completes its path of movement in the same direction.

4. The combination with a gear-shifting mechanism, a movable clutch member, and a spring for normally retaining said clutch member in an operative position, of means actuated by a single member for progressively disengaging said clutch member, retaining said clutch member in a relatively stationary position and simultaneously actuating said gear-shifting mechanism.

5. The combination with a gear-shifting mechanism, a movable clutch member, and a spring for normally retaining said member in an operative position, of a lever for progressively actuating said clutch member and said mechanism, and means whereby, when the lever is at a predetermined point in its path of movement, the clutch member is retained in an inoperative position during further forward movement of said lever.

6. The combination with a gear-shifting mechanism, a movable clutch member, and a spring for normally retaining said clutch member in an operative position, of a lever for actuating said clutch member and said mechanism, and means whereby the lever operates first to actuate said clutch member to an inoperative position and then to actuate said gear-shifting mechanism while the clutch member is relatively stationary in said inoperative position.

7. The combination with a guide member, and a lever having one arm for engaging said guide member, of an actuating member for engaging a second arm of said lever and for causing said lever to follow the surface of said guide member, and means for opposing the movement of said lever relatively to said guide member.

8. The combination with controlling means for gear-shifting mechanism, of a movable clutch member, means normally retaining said clutch member in an operative position, means for disengaging said clutch member and for actuating said controlling means, and means whereby said disengaging and actuating means is, during its operation, freed from the action of said retaining means so that it is more freely movable during the latter portion of its movement when actuating said controlling means.

9. In clutch-and-gear-operating mechanism, the combination with clutch members, of yieldable means normally tending to maintain said members in clutching relation, a device for controlling gear mechanism, and means for releasing said members from their clutching relation and for operating said device, said releasing and operating means operating against the action of said yieldable means for a portion of its movement and thereafter operating independently of the yieldable means to actuate the gear mechanism.

10. In clutch-and-gear-controlling mechanism, the combination with coöperating clutch members, of means tending to normally maintain said members in clutching relation, means for controlling gear mechanism, means for releasing said members from their clutching relation and for operating said gear-controlling means, and means whereby the action of the first named means opposes the operation of said releasing and operating means during a portion of the movement of the latter but thereafter exerts substantially no opposing force while the releasing and operating means is causing the operation of the gear-controlling means.

In testimony whereof, I have hereunto subscribed my name this 23rd day of Sept., 1914.

WILLIAM A. DICK.

Witnesses:
 W. M. CODDINGTON,
 B. B. HINES.